United States Patent [19]
Yoshida

[11] 4,291,440
[45] Sep. 29, 1981

[54] MOLDED COUPLING ELEMENT ASSEMBLY

[75] Inventor: Hiroshi Yoshida, Kurobe, Japan

[73] Assignee: Yoshida Kogyo K.K., Tokyo, Japan

[21] Appl. No.: 41,329

[22] Filed: May 22, 1979

[30] Foreign Application Priority Data

Jun. 5, 1978 [JP] Japan .................................. 53-67434

[51] Int. Cl.³ ............................................ A44B 19/40
[52] U.S. Cl. ........................ 24/205.16 R; 24/205.13 R
[58] Field of Search ............ 24/205.16 R, 205.16 D, 24/205.13 R, 205.13 D, 205.1 R; 139/384 B

[56] References Cited

U.S. PATENT DOCUMENTS

| | | | |
|---|---|---|---|
| 3,179,996 | 4/1965 | Clauss | 24/205.13 R X |
| 3,414,948 | 12/1968 | Jones | 24/205.13 R |
| 3,964,137 | 6/1976 | Kihara | 24/205.16 R |
| 4,033,014 | 7/1977 | Manning | 24/205.16 R |
| 4,075,874 | 2/1978 | Heimberger | 24/205.16 C X |
| 4,080,691 | 3/1978 | Moertel | 24/205.16 R X |
| 4,123,830 | 11/1978 | Matsuda et al. | 24/204.16 R |
| 4,140,157 | 2/1979 | Scott | 24/205.16 R X |
| 4,171,556 | 10/1979 | Moertel | 24/205.13 R |

FOREIGN PATENT DOCUMENTS

| | | | |
|---|---|---|---|
| 6703533 | 9/1967 | Netherlands | 24/205.16 C |
| 6804649 | 11/1968 | Netherlands | 24/205.16 R |

Primary Examiner—Roy D. Frazier
Assistant Examiner—Peter A. Aschenbrenner
Attorney, Agent, or Firm—Robert E. Burns; Emmanuel J. Lobato; Bruce L. Adams

[57] ABSTRACT

A coupling element assembly for slide fasteners includes a row of laterally spaced coupling elements made of synthetic resin. A pair of warp-knit elongate webs extend transversely of the coupling elements and are embedded respectively in a pair of leg portions of each coupling element to interconnect the coupling elements. Each of the warp-knit webs comprises at least one first thread forming a wale of chain stitches and a second thread interlaced or interknitted with the first thread. The warp-knit webs have roughened surfaces having interstices into which material of the coupling elements enters for secure anchorage of the coupling elements. At least one third thread may be interlaced or interknitted with the first threads and has portions spaced longitudinally of the first threads and embedded longitudinally in the coupling elements.

19 Claims, 41 Drawing Figures

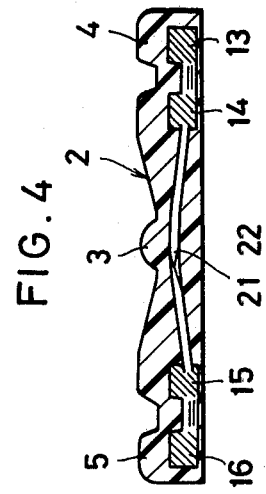
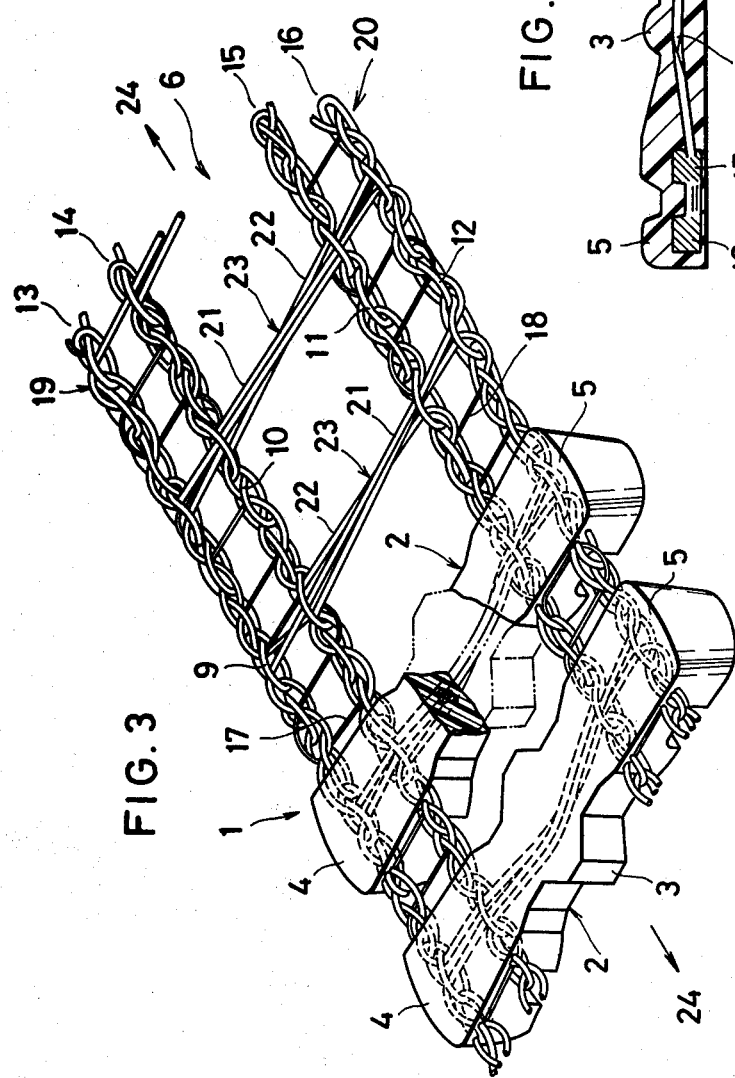

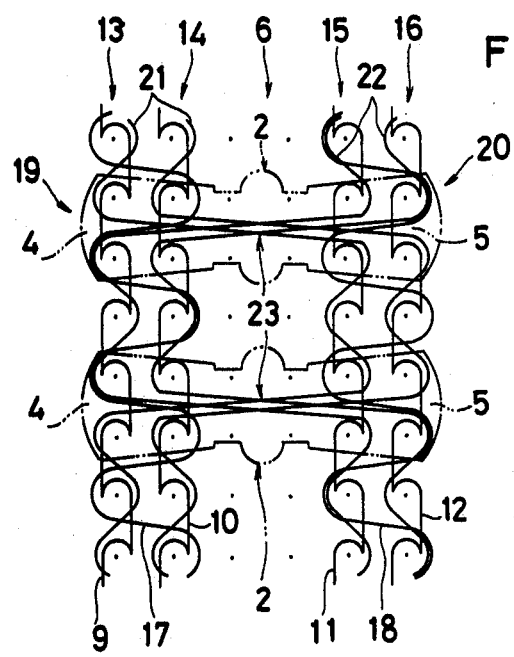
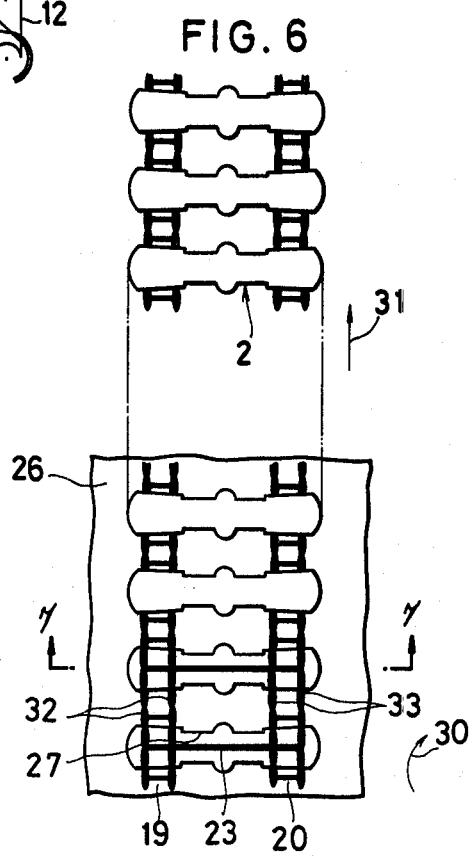

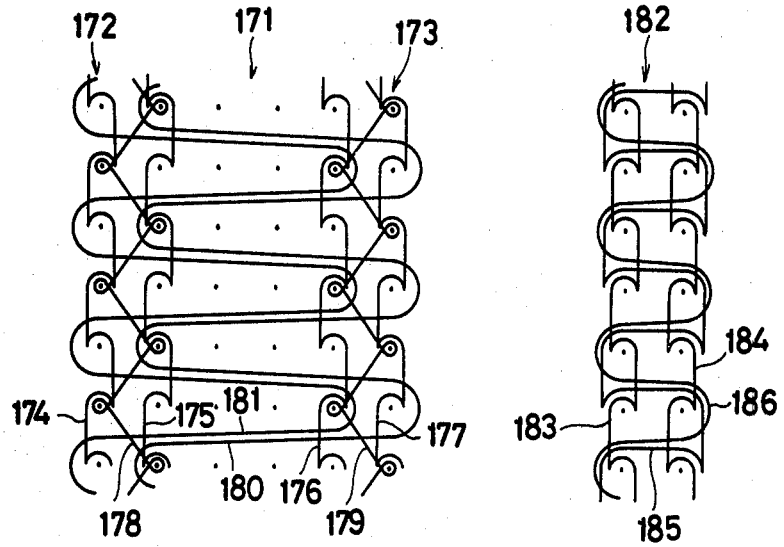
FIG. 29
FIG. 30
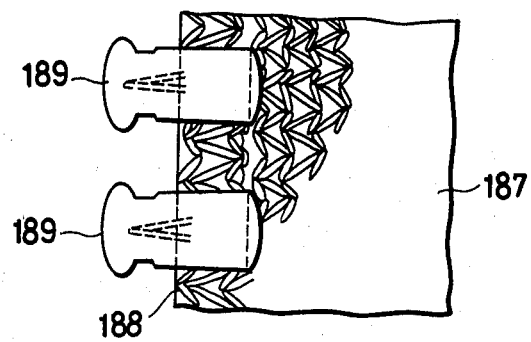
FIG. 31
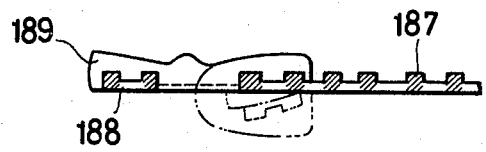
FIG. 32

MOLDED COUPLING ELEMENT ASSEMBLY

BACKGROUND OF THE INVENTION

1. Field of the Invention

The present invention relates generally to zippers or fasteners and more particularly to a coupling element assembly therefor.

2. Prior Art

Various coupling element assemblies have been proposed which have a row of discrete coupling elements interconnected by embedded connecting threads. Examples of such coupling element assemblies are disclosed in U.S. Pat. Nos. 3,414,948 and 4,033,014. Since the prior proposals employ connecting threads having a smooth surface that fails to provide a required degree of bonding strength, they make use of additional reinforcements such as widened leg portions of the coupling elements and curved portions of the connecting threads that are embedded in the coupling element leg portions, thereby strengthening the union between the coupling elements and the connecting threads.

Such reinforcing structures are disadvantageous in that their inclusion renders the overall manufacturing process complicated, and involves increased consumption of material and intricate adjustment of the tension to which the connecting threads are subjected. Another problem with the known coupling element assemblies is that the connecting threads, which are rigid enough for secure attachment of the coupling elements to a slide fastener stringer tape are not stretchable sufficiently to allow for smooth engagement and disengagement between opposed rows of coupling elements.

SUMMARY OF THE INVENTION

An object of the present invention is to provide a coupling element assembly having a row of coupling elements securely interconnected against any accidental displacement.

Another object of the present invention is to provide a coupling element assembly including means stably embedded in a row of coupling elements for an increased degree of union therewith Still another object of the present invention is to provide a coupling element assembly having coupling element connecting means which has a required degree of stretchability for smooth interengagement and disengagement between opposed companion rows of coupling elements.

According to the present invention, a coupling element assembly includes a pair of warp-knit elongate webs which connect a row of laterally spaced coupling elements, each warp-knit elongate web having at least one first thread forming a wale of chain stitches and a second thread disposed in and extending longitudinally along the wale of chain stitches. Each of the warp-knit elongate webs extends transversely of the spaced coupling elements and has a longitudinal portion embedded in respective leg portions of the coupling elements. At least one third thread is interlaced or knitted with the first thread in each of the warp-knit elongate webs and has a plurality of parallel portions spaced longitudinally on the first threads and extending transversely of the wales. The parallel spaced portions of the third thread are embedded in the coupling elements and extend longitudinally along the coupling elements.

BRIEF DESCRIPTION OF THE DRAWINGS

The above and other objects, advantages and features of the present invention will become apparent from the following description of the preferred embodiments, taken in conjunction with the accompanying drawings, in which:

FIG. 3 is a fragmentary perspective view, with parts broken away, of the coupling element assembly as it is spread before being bent into a U shape;

FIG. 4 is a longitudinal cross section view of a coupling element in the coupling element assembly;

FIG. 5 is a point diagram for a warp-knit elongate structure in the coupling element assembly;

FIG. 6 is a schematic plan view of a coupling element assembly according to the invention as it is continuously produced on a molding apparatus;

FIGS. 21 through 30 are point diagrams illustrating embodiments of warp knit elongate webs;

FIG. 31 is a fragmentary plan view of a slide fastener stringer;

FIG. 32 is a transverse cross section view of the slide fastener stringer of FIG. 31, illustrating the way in which the coupling element assembly is bent into a U shape;

DESCRIPTION OF THE PREFERRED EMBODIMENTS

Figure 1:
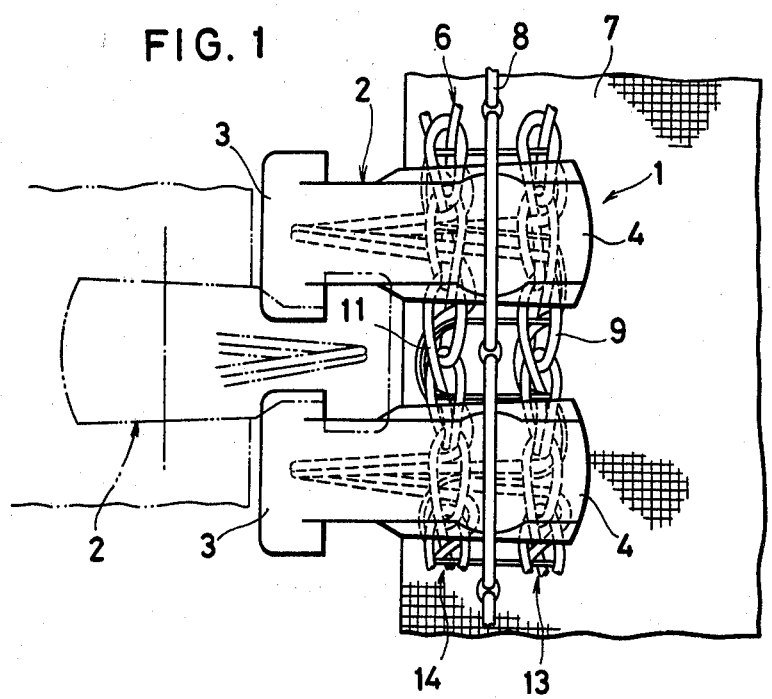
FIG. 1 is a fragmentary plan view of a coupling element assembly of the present invention, as attached to a stringer tape.
Figure 2:
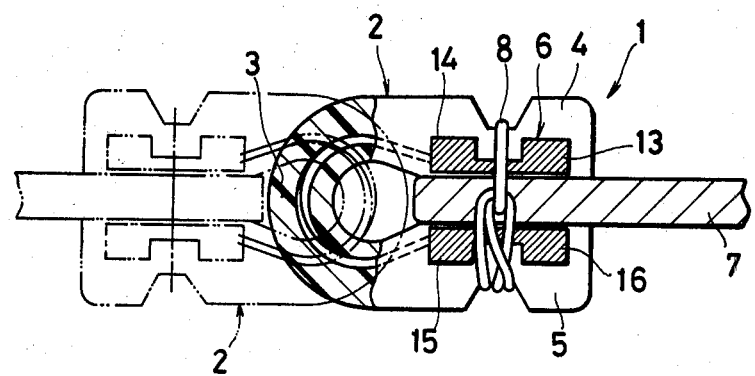
FIG. 2 is an end elevation view, with parts in cross section, of the coupling element assembly of FIG. 1.

In FIGS. 1 and 2, a coupling element assembly 1 includes a row of laterally spaced coupling elements 2 of synthetic resin, each having a coupling head portion 3 and a pair of leg portions 4, 5 extending from the coupling head portion 3, and a warp-knit elongate structure 6 extending transversely of the laterally spaced coupling elements 2 having longitudinal portions embedded in the coupling elements 2. The coupling element assembly 1 has a substantially U-shaped cross section and is attached astride a longitudinal marginal edge portion of a slide fastener stringer tape 7 by means of a thread with sewing stitches 8. The row of coupling elements 2 is engageable with a companion row of coupling element 2, shown in broken lines, to close a slide fastener.

As better shown in FIGS. 3 through 6, the warp-knit elongate structure 6 comprises a group of first threads 9, 10, 11 and 12 forming a plurality of wales 13, 14, 15 and 16 of chain stitches, respectively, and a pair of second threads 17, 18 interlaced with the wales 13, 14 and with the wales 15, 16, respectively, thereby providing a pair of warp-knit elongate webs 19, 20 spaced laterally from each other. Each of the second threads 17, 18 has a pattern of 0—0/2—2. The warp-knit elongate structure 6 further includes a pair of sets of third threads 21,22 interlaced with the wales 13, 14, 15 and 16 and having opposite patterns of 0—0/1—1/0—0/5—5/4—45—5 and 5—5/4—4/5—5/0—0/1—1/0—0, respectively.

The warp-knit elongate webs 19, 20 have longitudinal portions extending through and embedded in the leg portions 4, 5 of each of the coupling elements 2. The pair of sets of third threads 21, 22 have a plurality of parallel portions 23 spaced longitudinally on the first threads 9, 10, 11 and 12 and extending transversely of the wales 13, 14, 15 and 16. The parallel spaced portions 23 are embedded in the coupling elements 2 and extend substantially the full length of the coupling elements 2.

Thus, prior to being bent into a U shape ready for attachment to a stringer tape, the coupling element assembly 1 has a ladder-like structure. Each of the warp-knit webs 19, 20 also has a ladder-like structure which is composed of the wales 13, 14 or 15, 16 interconnected by the second thread 17 or 18. With such a ladder-like structure of the webs 19, 20, the leg portions 4, 5 of the coupling elements 2 are fastened to the webs 19, 20 with an increased degree of bonding strength. The warp-knit webs 19, 20 allow material of the coupling elements 2 to enter into their interstices, and have a roughened surface engaging the coupling elements 2, so that the coupling elements 2 can be anchored in place on the webs 19, 20.

The coupling element assembly 1 shown in FIG. 3 is folded on itself about a longitudinal axis 24 before the assembly 1 is mounted on a stringer tape.

Figure 7:
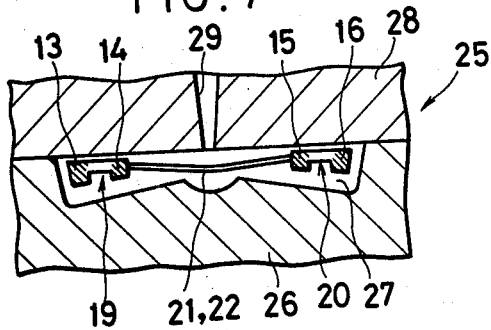
FIG. 7 is a fragmentary cross-sectional view taken along section line 7—7 of FIG. 6.
Figure 8:
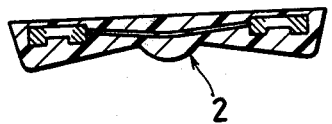
FIG. 8 is a longitudinal cross section view of a coupling element formed on the molding apparatus shown in FIGS. 6 and 7.
Figure 9:
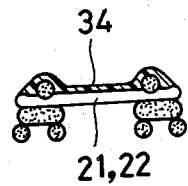
FIG. 9 is an enlarged cross section view of a portion of a warp-knit elongate web which is located between adjacent coupling element leg portions.

The coupling element assembly 1 is continuously produced on a molding apparatus 25 shown in FIGS. 6 and 7. The molding apparatus 25 has a molding wheel 26 having a plurality of elongate mold cavities 27 in its periphery. The mold cavities 27 are closed by an injection shoe 28 having a sprue or passageway 29 through which molten synthetic resin is forced into mold cavities 27. The molding wheel 26 has in its periphery a pair of annular grooves (not shown) intersecting the end portions of the elongate mold cavities 27 corresponding to the leg portions 4, 5 of the coupling elements 2 for receiving the warp-knit webs 19, 20.

In operation of the molding apparatus, the warp-knit elongate structure 6 is placed in the mold cavities 27 closed by the closed shoe 28 as shown in FIG. 7, and molten synthetic resin is forced into the mold cavities 27. The injected synthetic resin is molded around the warp-knit webs 19, 20 and the transverse portions 23 of the third threads 21, 22. The coupling element assembly 1 is continuously produced as the molding wheel 26 is being rotated in the direction of the arrow 30 (FIG. 6). The coupling element assembly 1, as it is formed, is discharged in the direction of the arrow 31 in timed relation with the rotation of the molding wheel 26.

The portions 32, 33 of the warp-knit elongate webs 19, 20, which are located between adjacent coupling elements 2, can be impregnated with molten synthetic resin.

A slight clearance between the molding wheel 26 and the injection shoe 28 allows a thin layer 34 of synthetic resin to be formed in an area surrounded by the web portions 32, 33 and the coupling elements 2, 2 disposed adjacent to each other.

Figure 10:
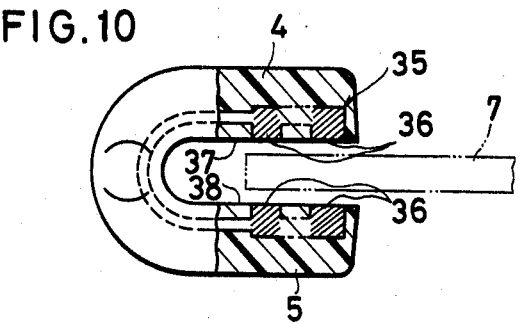
FIG. 10 is an end elevation view, with parts in cross section, of a modified coupling element assembly.

The warp-knit structure 6 shown in FIG. 2 is disposed with the wales 13, 14, 15 and 16 directed away from the stringer tape 7. A modified warp-knit structure 35 illustrated in FIG. 10 has its wales 36 directed toward the stringer tape 7 and lying substantially flush with the opposed faces 37, 38 of the coupling element leg portions 4, 5.

Figure 11:
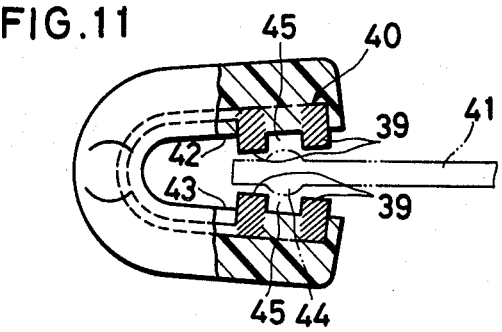
FIG. 11 is a view similar to FIG. 10, showing another modified coupling element assembly.
Figure 12:
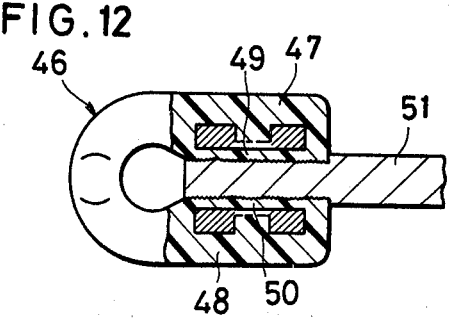
FIG. 12 is an end elevational view, partly in cross section, of a modified coupling element assembly bonded to a slide fastener stringer tape.

FIG. 11 shows another modification in which the wales 39 of a warp-knit structure 40 extend toward a stringer tape 41 beyond the opposed faces 42, 43 of the coupling element leg portions 4, 5. The stringer tape 41 has an elongate bulged portion 44 that is placed in a space 45 between the wales 39 on each of the leg portions 4, 5. According to still another modification shown in FIG. 12, each of coupling elements 46 has a pair of leg portions 47, 48 including opposed thickened layers 49, 50, respectively, bonded to a stringer tape 51 by welding or adhesive bonding.

Figure 13:
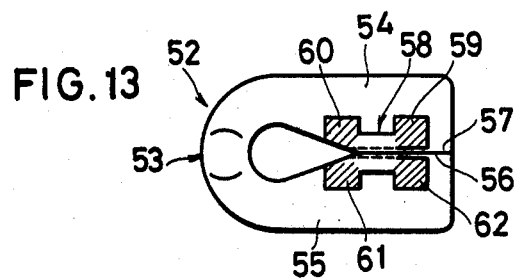
FIG. 13 is an end elevation view of a modified coupling element assembly with coupling element leg portions fused together.

Another modified coupling element assembly 52 illustrated in FIG. 13 comprises a plurality of coupling elements 53 each having a pair of leg portions 54, 55 including opposed faces 56, 57, respectively, integrally fused together or bonded together by an adhesive. A warp-knit elongate structure 58 includes a pair of wales 59,60 embedded in the coupling element leg portion 54 and a pair of wales 61, 62 embedded in the coupling element leg portion 55.

Figure 14:
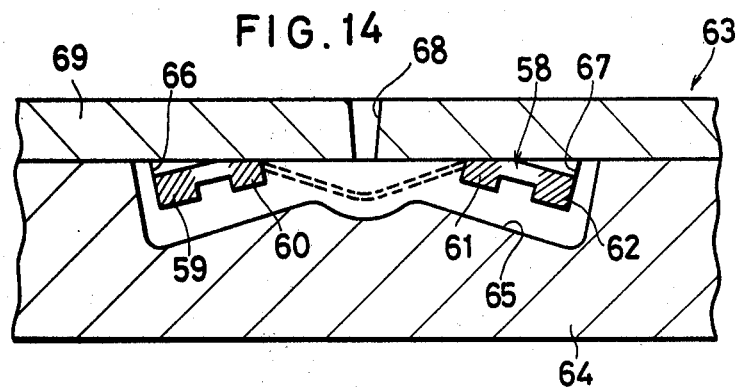
FIG. 14 is a fragmentary cross section view of a molding apparatus for forming the coupling element assembly shown in FIG. 13.

FIG. 14 illustrates an injection molding apparatus 63 for forming the coupling element assembly 52 of FIG. 13. The injection molding apparatus 63 includes a molding wheel 64 having in its periphery a plurality of mold cavities 65 and a pair of annular grooves 66, 67 extending across the mold cavities 65 for receiving the pairs of wales 59, 60 and 61, 62, respectively. The annular grooves 66, 67 have a bottom slanted with respect to the peripheral surface of the molding wheel 64, so that the pairs of wales 59, 60 and 61, 62 as placed in the grooves 66, 67 are inclined with the outer wales 59, 62 positioned more deeply in the mold cavities 65 than the inner wales 60, 61. With the warp-knit structure 58 thus placed, molten synthetic resin is forced under pressure through a passageway 68 in an injection shoe 69 into the mold cavities 65, thereby forming the coupling element assembly 52 shown in FIG. 13.

Figure 15:
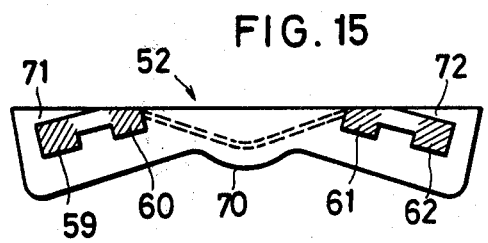
FIG. 15 is an end elevation view of a coupling element assembly produced on the molding apparatus of FIG. 14.
Figure 16:
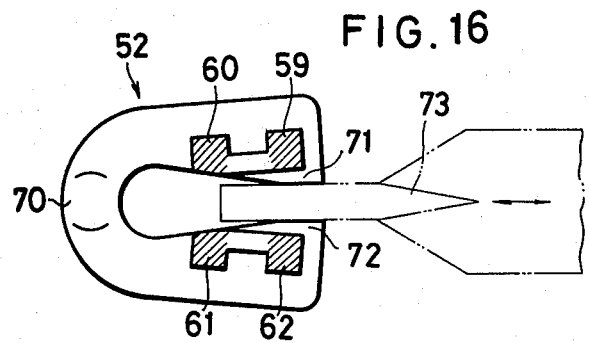
FIG. 16 is an end elevation view illustrative of the way in which the coupling element leg portions are fused together.

Each coupling element 70 of the coupling element assembly 52 of FIG. 15 includes a pair of relatively thick layers 71, 72 of synthetic resin on the outer wales 59, 62. The layers 71, 72 serve to define the opposite faces 56, 57, respectively. The coupling element assembly 52 is folded on itself along its longitudinal axis with an ultrasonic welding horn 73 placed between and in contact with the layers 71, 72 (FIG. 16). The ultrasonic welding horn 73 is then energized to fuse the layers 71, 72 together, whereupon the coupling element assembly 52 illustrated in FIG. 13 is produced. With this arrangement the inner wales 60, 61 are impregnated less with synthetic resin than the outer wales 59, 62, and, therefore, are more stretchable longitudinally than the outer wales 59, 62. Such an increased degree of stretchability of the inner wales 60, 61 permits the coupling heads of the coupling elements 70 to shift laterally enough for smooth engagement and disengagement between a pair of interengageable rows of coupling elements.

Figure 17:
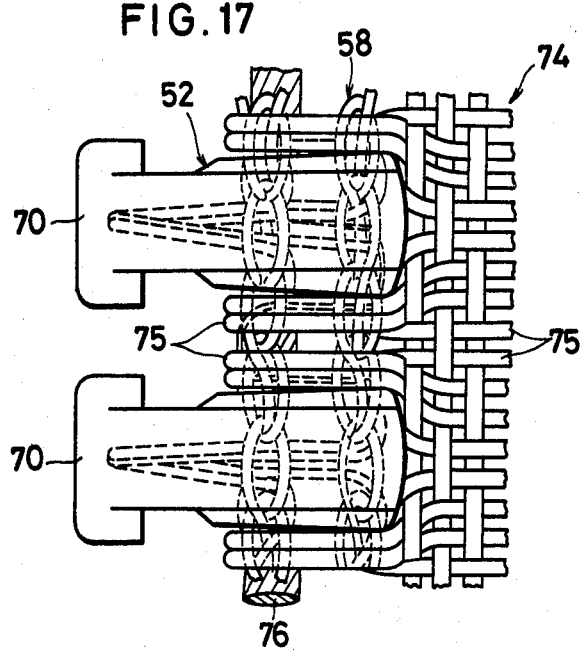
FIG. 17 is a fragmentary plan view of the coupling element assembly of FIG. 13 as woven into a woven-fabric stringer tape.
Figure 18:
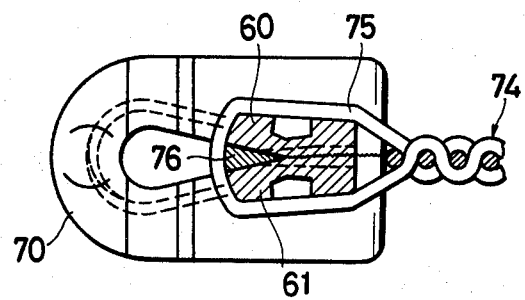
FIG. 18 is a transverse cross section view of the coupling element assembly of FIG. 17.

FIGS. 17 and 18 show the coupling element assembly 52 of FIG. 13 woven into a longitudinal edge of a woven-fabric stringer tape 74. The woven stringer tape 74 includes a weft thread 75 extending around exposed portions of the warp-knit structure 58 which are located between adjacent coupling elements 70. A core thread 76 of stranded yarns extends longitudinally through the coupling element assembly 52 and is disposed between the inner wales 60, 61 of the warp-knit structure 58. The core thread 76 is retained in position by engagement with the weft thread 75 surrounding the warp-knit structure 58.

Figure 19:
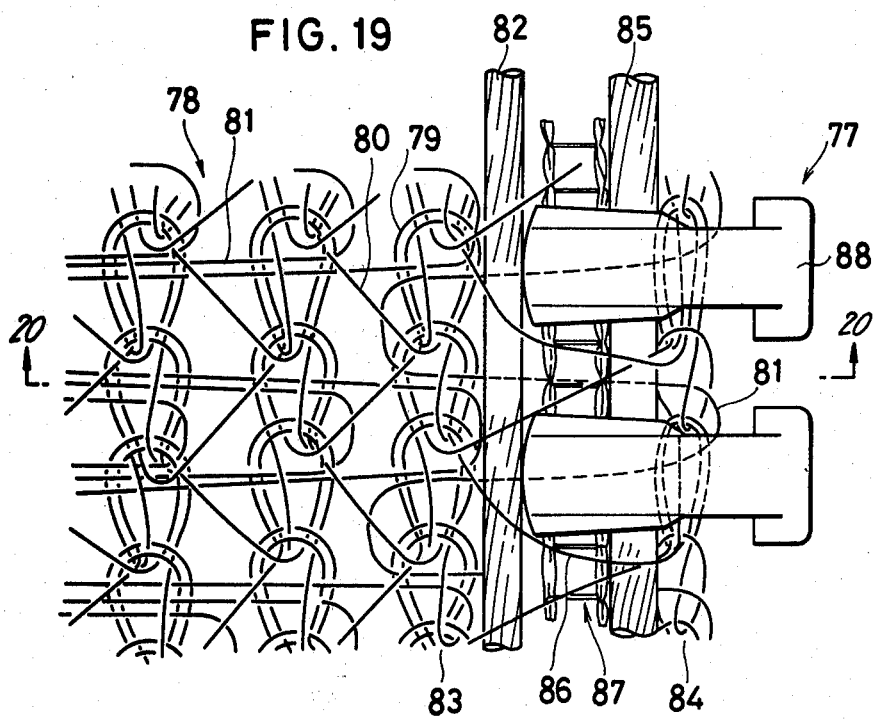
FIG. 19 is a fragmentary plan view of a coupling element assembly as knit into a knitted-fabric stringer tape.
Figure 20:
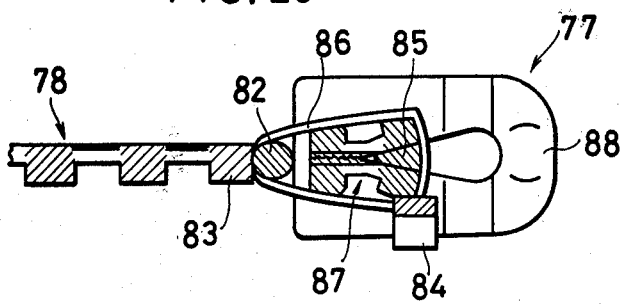
FIG. 20 is a cross section view taken along section line 20—20 of FIG. 19.

As shown in FIGS. 19 and 20, a coupling element assembly 77 may be knit into a longitudinal edge of a knit-fabric stringer tape 78. The stringer tape 78 is composed of a plurality of threads 79 forming wales of chain stitches having a pattern of 1—0/0—1, a plurality of threads 80 having a pattern of 1—0/1—2, a plurality of threads 81 having a pattern of 0—0/4—4, and a longitudinal warp cord 82 disposed between an outermost pair of wales 83, 84. The coupling element assembly 77 includes a longitudinal core thread 85 extending therethrough and is fastened in position by the outermost wale 84, a thread 86 extending between the wales 83, 84 in a pattern of 1—0/4—3, and one of the threads 81 extending between the outermost wales 83, 84.

More specifically, the portions of a warp-knit structure 87 of the coupling element assembly 77, which are positioned between adjacent coupling elements 88, are surrounded by the thread 86. The outermost wale 84 is displaced away from the coupling head portions of the coupling elements 88 and is held against a lower one of the leg portions of each coupling element 88 by being pulled by the thread 86 and said one of the threads 81.

The threads 81 and 86 are preferably comprised of yarns of high thermal shrinkability for better fastening of the coupling elements 88 to the stringer tape 78 and for better tensioning of the outermost wale 84 against the lower leg portions of the coupling elements 88.

Figure 21:
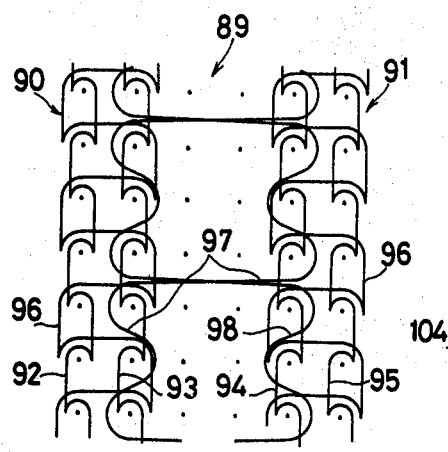

A warp-knit elongate structure 89 shown in FIG. 21 comprises a pair of warp-knit elongate webs 90, 91 including two pairs of first threads 92, 93, 94 and 95 each forming a wale of chain stitches in a pattern of 0—1/1—0. Each of the webs 90, 91 has a second thread 96 interknitted with the wales in a pattern of 2—0/0—2. A pair of third threads 97, 98 are interlaced with the inner threads 93, 94 in opposite symmetrical patterns of 4—4/3—3/4—4/0-0/1—1/0—0 and 0—0/1—1/0—0/-4—4/3—3/4—4.

Figure 22:
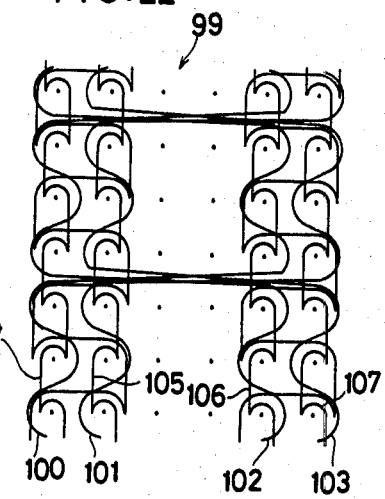

A warp-knit elongate structure 99 is illustrated in FIG. 22 and includes a pair of sets of third threads 100, 101 and 102, 103 interlaced with two pairs of first threads 104, 105, 106 and 107 in opposite symmetrical patterns of 5—5/4—4/5—5/0—0/1—1/0—0 and 0—0/1—1/0—0/5—5/4—4/5—5.

Figure 23:
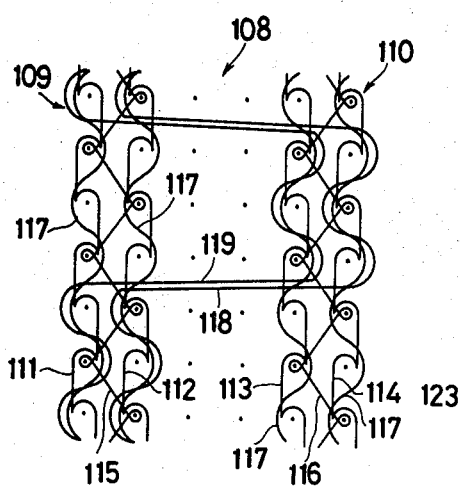

According to a warp-knit elongate structure 108 shown in FIG. 23, a pair of warp-knit elongate webs 109, 110 have two pairs of first threads 111, 112, 113 and 114 each forming a wale of chain stitches in a pattern of 0—1/1—0. A pair of second threads 115, 116 are interknitted with the pairs of first threads 111, 112 and 113, 114, respectively, in a pattern of 1—0/1—2. A warp thread 117 extends longitudinally in and along each of the first threads 111, 112, 113 and 114 in a pattern of 1—1/0—0. A pair of third threads 118, 119 are interlaced with the first threads 111, 112, 113 and 114 in a pattern of 5—5/4—4/5—5/0—0/ 1—1/0—0.

Figure 24:
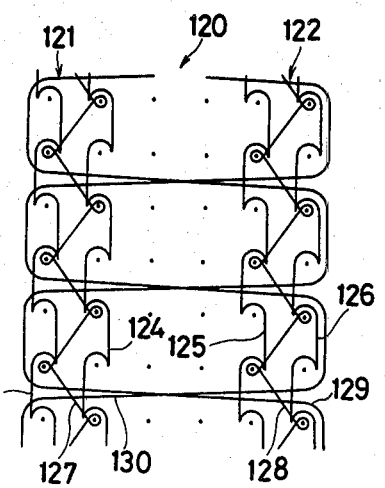

A warp-knit elongate structure 120 of FIG. 24 includes a pair of warp-knit elongate webs 121, 122 comprising two pairs of first threads 123, 124, 125 and 126 having a pattern of 0—1/ 1—0, and a pair of second threads 127, 128 interknitted with the pairs of first threads 123, 124 and 125, 126, respectively. The warp-knit structure 120 has a pair of third threads 129, 130 interlaced with the outer first threads 123, 126 in opposite symmetrical patterns of 0—0/6—6/6—6/0—0 and 6—6/0—0/0—0/6—6.

Figure 25:
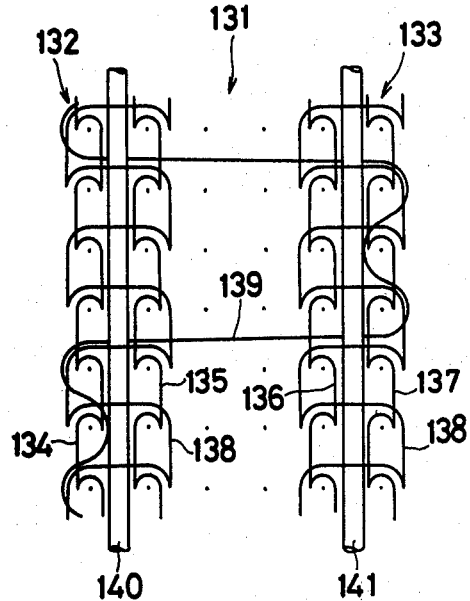

A warp-knit elongate structure 131 illustrated in FIG. 25 is comprised of a pair of warp-knit elongate webs 132, 133 including two pairs of first threads 134, 135, 136 and 137 having a pattern of 0—1/1—0. Interknitted with each pair of the first threads 134, 135 or 136, 137 is a second thread 138 having a pattern of 2—0/0—2. A third thread 139 is interlaced with the outer first threads 134, 137 in a pattern of 6—6/5—5/6—6/0—0/1—1/-0—0. A pair of reinforcing warp threads 140, 141 extend longitudinally between the pair of first threads 134, 135 and between the pair of first threads 136, 137.

Figure 26:
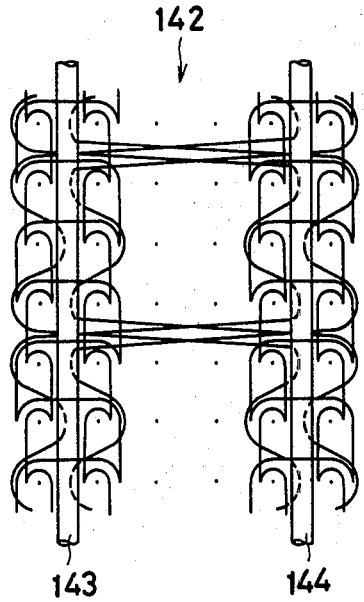

A warp-knit elongate structure 142 shown in FIG. 26 is similar to the structure 99 of FIG. 22 and differs therefrom only in that the warp-knit structure 142 includes a pair of reinforcing warp threads 143, 144.

Figure 27:
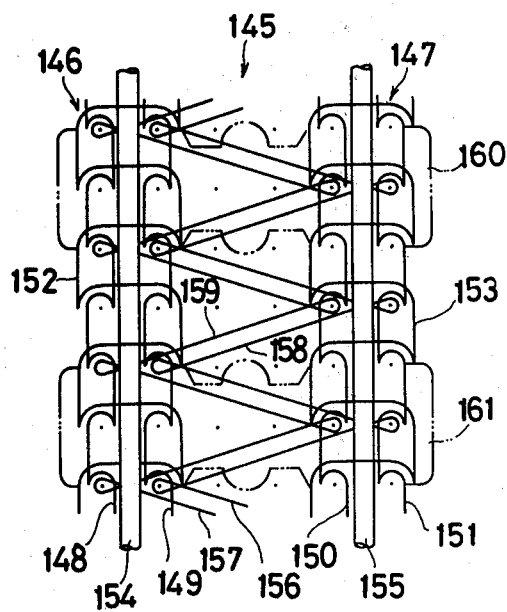

A warp-knit elongate structure 145 is shown in FIG. 27 as comprising a pair of warp-knit elongate webs 146, 147 including two pairs of first threads 148, 149, 150 and 151 having a pattern of 0—1/1—0. A pair of second threads 152, 153 are interknitted with the pair of first threads 148, 149 and with the pair of first threads 150, 151, respectively. The warp-knit elongate webs 146, 147 has a pair of reinforcing warp threads 154, 155 extending longitudinally between the pair of first threads 148, 149 and between the pair of first threads 150, 151, respectively. A pair of third threads 156, 157 are interknitted with the first threads 148, 149, 150 and 151 in a pattern of 4—5/0—1.

The third threads 156, 157 are preferably made of thermally shrinkable yarns. The portions 158, 159 of the third threads 156, 157 which are to be positioned between adjacent coupling elements 160, 161 are shrunk when subjected to heat during a dyeing process, with the result that the portions 158, 159 will not interfere with proper interengagement between a pair of rows of coupling elements.

Figure 28:
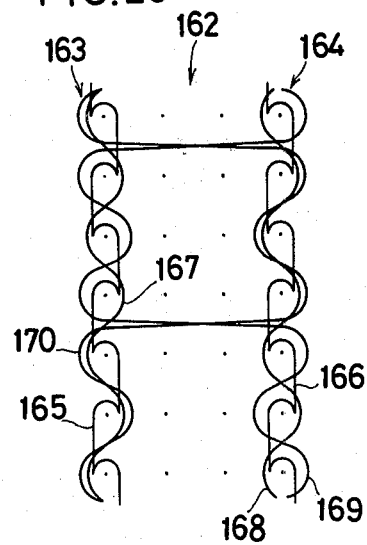

A warp-knit elongate structure 162 shown in FIG. 28 comprises a pair of warp-knit elongate webs 163, 164 including a pair of first threads 165, 166 having a pattern of 0—1/1—0. A pair of second threads 167, 168 extend longitudinally in and along the first threads 165, 166 in a pattern of 1—1/0—0. A pair of third threads 169, 170 are interlaced with the frst threads 165, 166 in opposite symmetrical patterns of 0—0/1—1/0—0/4—4/3—3/4—4 and 4—4/3—3/4—4/0—0/1—1/0—0.

A warp-knit elongate structure 171 illustrated in FIG. 29 includes a pair of warp-knit elongate webs 172, 173 comprising two pairs of first threads 174, 175, 176 and 177 having a pattern of 0—1/1—0. A pair of second threads 178, 179 are interknitted with the pair of first threads 174, 175 and with the pair of first threads 176, 177, respectively. The warp-knit structure 171 includes a pair of third threads 180, 181 interlaced with the first threads 174, 175, 176 and 177 in a pattern of 5—5/0—0.

FIG. 30 shows a warp-knit elongate web 182 comprising a pair of first threads 183, 184 having a pattern of 0—1/1—0, a second thread 185 interknitted with the first threads 183, 184 in a pattern of 2—0/0—2, and a warp thread 186 interlaced with the first threads 183, 184 in a pattern of 2—2/0—0. A pair of such warp-knit elongate webs 182 are embedded in the leg portions of a row of laterally spaced coupling elements. Although a coupling element assembly using a pair of the warp-knit elongate webs 182 has no threads embedded longitudinally in the coupling elements, the coupling elements are securely fastened to the warp-knit webs 184 because the warp-knit webs 184 have roughened surfaces with interstices filled by material of the coupling elements.

A slide fastener stringer shown in FIGS. 31 and 32 has a stringer tape 187 of a warp-knit fabric interknitted with a warp-knit elongate structure 188 having portions embedded in a row of coupling elements 189 of synthetic resin. The row of coupling elements 189 is folded on itself about a longitudinal axis.

Figure 33:
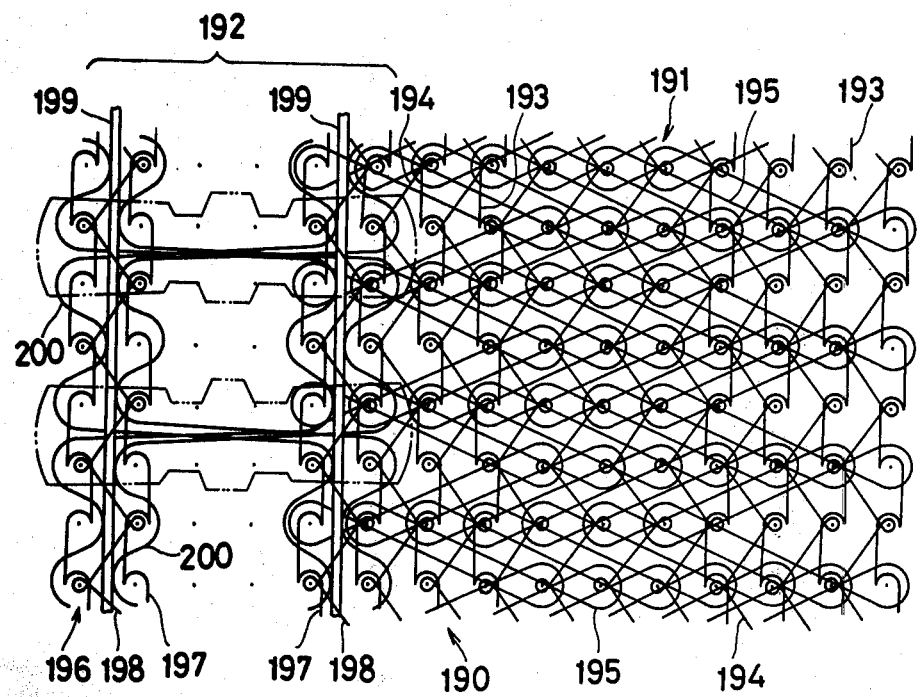
FIG. 33 is a point diagram for a knitted slide fastener stringer.

FIG. 33 illustrates an embodiment of a slide fastener stringer 190 having a stringer tape 191 and a coupling element assembly 192. The stringer tape 191 is composed of a plurality of threads 193 having a pattern of 0—1/1—0, a plurality of threads 194 having a pattern of 1—0/1—2, and a plurality of threads 195 having a pattern of 4—5/1—0. The coupling element assembly 192 includes a warp-knit elongate structure 196 extending along one longitudinal edge of the stringer tape 191. The warp-knit elongate structure 196 comprises two pairs of first threads 197 having a pattern of 0—1/1—0, a pair of second threads 198 having a pattern of 1—0/1—2 interknitted with the pairs of first threads 197, and a pair of longitudinal reinforcing warp threads 199 each extending between the respective pair of first threads 197. A pair of sets of third threads 200 are interlaced with the pairs of first threads 197 in opposite symmetrical patterns of 0—0/1—1/0—0/5—5/4—4/5—5 and 5—5/4—4/5—5/0—0/1—1/0—0.

The stringer tape 191 and the warp-knit elongate structure 196 are interconnected by one of the threads 194 and two of the threads 195.

Figure 34:
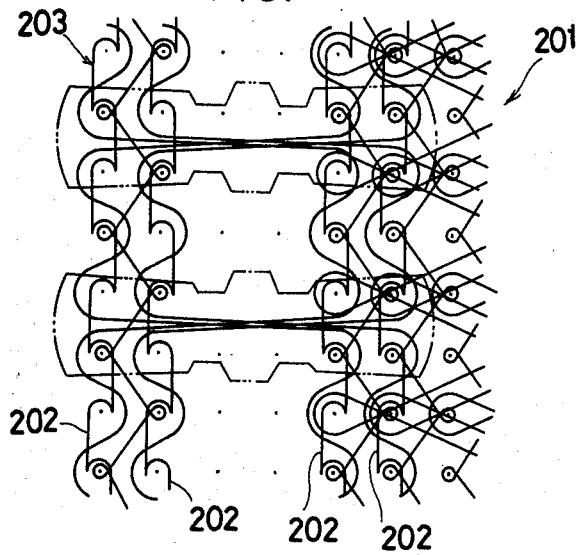
FIG. 34 is a point diagram for a knitted slide fastener stringer.

A slide fastener stringer 201 shown in FIG. 34 differs from the slide fastener stringer 190 shown in FIG. 33 in that the stringer 201 has no reinforcing warp threads and has two pairs of more rigid first threads 202 in its warp-knit elongate structure 203. Each of the first threads 202 is preferably composed of a thickened yarn or stranded yarns.

Figure 35:
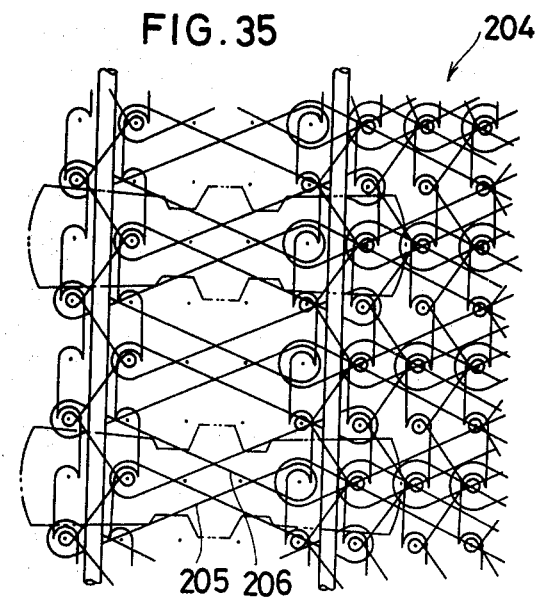
FIG. 35 is a point diagram similar to FIG. 34, for another embodiment.

FIG. 35 shows a slide fastener stringer 204 according to another embodiment, in which a pair of third threads 205, 206 have a pattern of 4—5/1—0.

Figure 36:
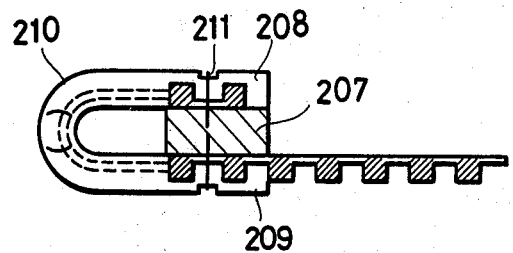
FIGS. 36 through 38 are end elevation views of different embodiments of knitted slide fastener stringers.

As shown in FIG. 36, a core material 207 is disposed between a pair of leg portions 208, 209 of each coupling element 210. The leg portions 208, 209 are sewn to the core material 207 by sewing stitches 211 such as lockstitches or double chain stitches.

Figure 37:
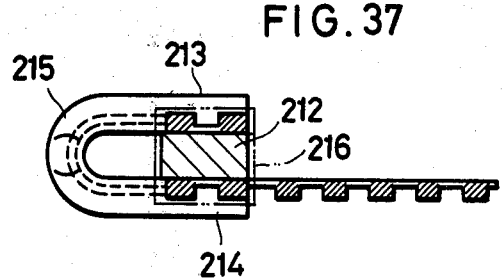

FIG. 37 shows a core material 212 secured between a pair of leg portions 213, 214 of each coupling element 215 by overlock stitches 216.

Figure 38:
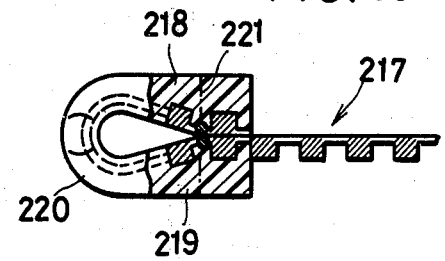

According to a slide fastener stringer 217 illustrated in FIG. 38, a pair of leg portions 218, 219 of each coupling element 220 are fused or bonded together and are fastened together by sewing stitches 221.

The embodiments illustrated in FIGS. 36 through 38 are applicable to the slide fastener stringers of FIGS. 31 through 35.

Figure 39:
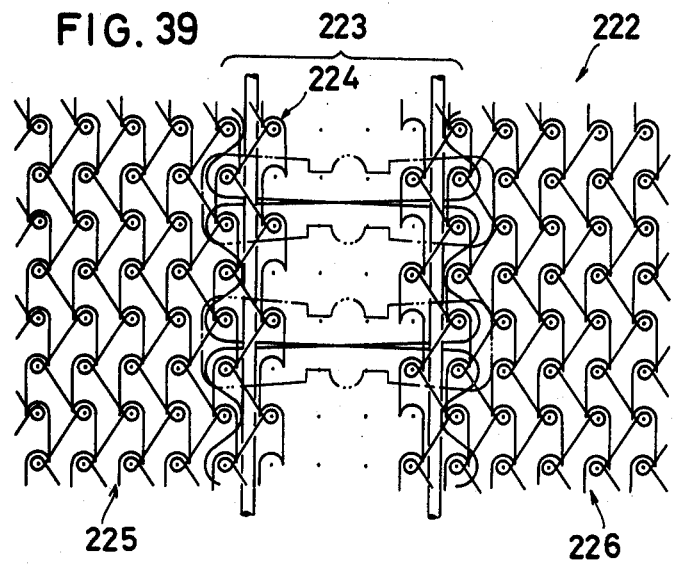
FIG. 39 is a point diagram for another knitted slide fastener stringer.
Figure 40:
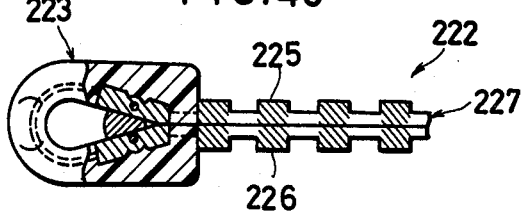
FIG. 40 is an end elevation view, partly cut away, of the knitted slide fastener stringer shown in FIG. 39, folded over on itself.

FIGS. 39 and 40 show a slide fastener stringer 222 comprising a coupling element assembly 223 having a warp-knit elongate structure 224, and a pair of warp-knit fabrics 225, 226 disposed one on each side of and interknitted with the warp-knit elongate structure 224. When the coupling element assembly 223 is folded on itself about its longitudinal axis, the warp-knit fabrics 225, 226 are superimposed on each other, forming a stringer tape 227.

Figure 41:
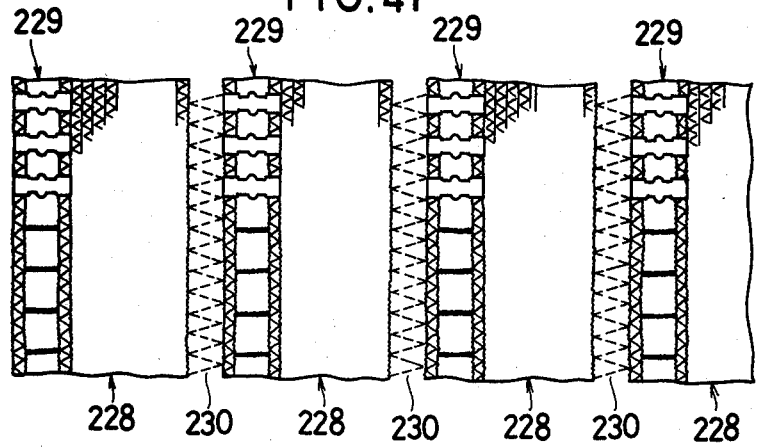
FIG. 41 is a schematic plan view of a plurality of the knitted slide fastener stringers of FIG. 33, connected together by connecting threads.

A plurality of slide fastener stringers 228 each having an integral coupling element assembly 229 according to the present invention can be produced simultaneously as shown in FIG. 41. The slide fastener stringers 228 are laterally connected by water-soluble connecting threads 230, so that the stringers 228 can be separated by being dipped into water as in a dyeing process.

The embedded parallel spaced portions stabilize the coupling elements positionally against any displacement particularly in the transverse direction thereof. This reinforcing arrangement is advantageous especially where the coupling elements are made of an unstretched plastic material that is easily deformable, ductile and soft.

Although preferred embodiments have been shown and described in detail, it should be understood that various changes and modifications can be made therein without departing from the scope of the appended claims.

What is claimed is:

1. A coupling element assembly for slide fasteners comprising:
   a row of laterally spaced coupling elements each having a head portion and a pair of leg portions extending from said head portion; and
   a pair of warp-knit elongate webs each including at least one first thread forming a wale of chain stitches and a second thread disposed in and extending longitudinally along said wale of chain stitches, each of said warp-knit elongate webs extending transversely of said spaced coupling elements and having a longitudinal portion embedded in respective leg portions of said coupling elements to interconnect the coupling elements, each of said warp-knit elongate webs including a pair of first threads forming a pair of laterally spaced wales of chain stitches, a third thread interlaced with the first threads in said warp-knit elongate webs and having a plurality of parallel portions spaced longitudinally on said first threads and extending transversely of said wales, and said parallel spaced portions extending substantially the full length of said coupling elements.

2. A coupling element assembly for slide fasteners comprising:

a row of laterally spaced coupling elements each having a head portion and a pair of leg portions extending from said head portion; and a pair of warp-knit elongate webs each including at least one first thread forming a wale of chain stitches and a second thread disposed in and extending longitudinally along said wale of chain stitches, each of said warp-knit elongate webs extending transversely of said spaced coupling elements and having a longitudinal portion embedded in respective leg portions of said coupling elements to interconnect the coupling elements, each of said warp-knit elongate webs including a pair of first threads forming a pair of laterally spaced wales of chain stitches, a pair of third threads symmetrically interlaced with a selected one of the first threads in each of said warp-knit elongate webs and having a plurality of parallel portions spaced longitudinally on said first threads and extending transversely of said wales, said parallel spaced portions being embedded in said coupling elements extending longitudinally along said coupling elements, and said parallel spaced portions extending substantially the full length of said coupling elements.

3. A coupling element assembly for slide fasteners comprising:

a row of laterally spaced coupling elements each having a head portion and a pair of leg portions extending from said head portion; and a pair of warp-knit elongate webs each including at least one first thread forming a wale of chain stitches and a second thread disposed in and extending longitudinally along said wale of chain stitches, each of said warp-knit elongate webs extending transversely of said spaced coupling elements and having a longitudinal portion embedded in respective leg portions of said coupling elements to interconnect the coupling elements, each of said warp-knit elongate webs including a pair of first threads forming a pair of laterally spaced wales of chain stitches, a pair of sets of third threads symmetrically interlaced with said first threads in said warp-knit elongate webs and having a plurality of parallel portions spaced longitudinally on said first threads and extending transversely of said wales, said parallel spaced portions being embedded in said coupling elements extending longitudinally along said coupling elements, and said parallel spaced portions extending substantially the full length of said coupling elements.

4. A coupling element assembly for slide fasteners comprising:

a row of laterally spaced coupling elements each having a head portion and a pair of leg portions extending from said head portion; and a pair of warp-knit elongate webs each including at least one first thread forming a wale of chain stitches and a second thread disposed in and extending longitudinally along said wale of chain stitches, each of said warp-knit elongate webs extending transversely of said spaced coupling elements and having a longitudinal portion embedded in respective leg portions of said coupling elements to interconnect the coupling elements, each of said warp-knit elongate webs including a pair of first threads forming a pair of laterally spaced wales of chain stitches, a pair of third thread knitted with said first threads in said warp-knit elongate webs and having a plurality of parallel portions spaced longitudinally on said first threads extending transversely of said wales, said parallel spaced portions being embedded in said coupling elements longitudinally along said coupling elements, and said parallel spaced portions extending substantially the full length of said coupling elements.

5. A coupling element assembly for slide fasteners comprising:

a row of laterally spaced coupling elements each having a head portion and a pair of leg portions extending from said head portion; and a pair of warp-knit elongate webs each including at least one first thread forming a wale of chain stitches and a second thread disposed in and extending longitudinally along said wale of chain stitches, each of said warp-knit elongate webs extending transversely of said spaced coupling elements and having a longitudinal portion embedded in respective leg portions of said coupling elements to interconnect the coupling elements, a pair of third threads symmetrically interlaced with the first threads in said warp-knit elongate webs and having a plurality of parallel portions spaced longitudinally on said first threads and extending transversely of said wales, said parallel spaced portions being embedded in said coupling elements extending longitudinally along said coupling elements, and said parallel spaced portions extending substantially the full length of said coupling elements.

6. A coupling element assembly for slide fasteners comprising:

A row of laterally spaced coupling elements each having a head portion and a pair of leg portions extending from said head portion; and a pair of warp-knit elongate webs each including at least one first thread forming a wale of chain stitches and a second thread disposed in and extending longitudinally along said wale of chain stitches, each of said warp-knit elongate webs extending transversely of said spaced coupling elements and having a longitudinal portion embedded in respective leg portions of said coupling elements to interconnect the coupling elements, a third thread interlaced with the first threads in said warp-knit elongate webs and having a plurality of parallel portions spaced longitudinally on said first threads and extending transversely of said wales, said parallel spaced portions being embedded in said coupling elements extending longitudinally along said coupling elements, and said parallel spaced portions extending substantially the full length of said coupling elements.

7. A coupling element assembly for slide fasteners according to claim 6, each of said warp-knit elongate webs incuding a pair of first threads forming a pair of laterally spaced wales of chain stitches.

8. A coupling element assembly for slide fasteners according to claim 6 or 7, and said third thread having a pattern of 6—6/5—5/6—6/0—0/1—1/0—0.

9. A coupling element assembly for slide fasteners according to claim 6 or 7, and said third thread having a pattern of 5—5/0—0.

10. A coupling element assembly for slide fasteners comprising:
   a row of laterally spaced coupling elements each having a head portion and a pair of leg portions extending from said head portion; and
   a pair of warp-knit elongate webs each including at least one first thread forming a wale of chain stitches and a second thread disposed in and extending longitudinally along said wale of chain stitches, each of said warp-knit elongate webs extending transversely of said spaced coupling elements and having a longitudinal portion embedded in respective leg portions of said coupling elements to interconnect the coupling elements,
   a pair of third threads symmetrically interlaced with a selected one of the first threads of each of said warp-knit elongate webs and having a plurality of parallel portions spaced longitudinally on said first threads and extending transversely of said wales,
   said parallel spaced portions being embedded in said coupling elements extending longitudinally along said coupling elements,
   and said parallel spaced portions extending substantially the full length of said coupling elements.

11. A coupling element assembly for slide fasteners according to claim 10, and each of said warp-knit elongate webs including a pair of first threads forming a pair of laterally spaced wales of chain stitches.

12. A coupling element assembly for slide fasteners according to claim 10 or 11, said pair of third threads comprising opposite patterns of 4—4/3—3/4—4/-0—0/1—1/0—0 and 0—0/1—1/0—0/4—4/3—3/4—4.

13. A coupling element assembly for slide fasteners according to claim 10 or 11 and said pair of third threads comprising opposite patterns of 0—0/6—6/-6—6/0—0 and 6—6/0—0/0—0/6—6.

14. A coupling element assembly for slide fasteners comprising:
   a row of laterally spaced coupling elements each having a head portion and a pair of leg portions extending from said head portion; and
   a pair of warp-knit elongate webs each including at least one first thread forming a wale of chain stitches and a second thread disposed in and extending longitudinally along said wale of chain stitches, each of said warp-knit elongate webs extending transversely of said spaced coupling elements and having a longitudinal portion embedded in respective leg portions of said coupling elements to interconnect the coupling elements,
   each of said warp-knit elongate webs including a pair of first threads forming a pair of laterally spaced wales of chain stitches,
   a pair of sets of third threads symmetrically interlaced with said first threads in said warp-knit elongate webs and having a plurality of parallel portions spaced longitudinally on said first threads and extending transversely of said wales, and
   said parallel spaced portions being embedded in said coupling elements extending longitudinally along said coupling elements, and said parallel spaced portions extending substantially the full length of said coupling elements.

15. A coupling element assembly for slide fasteners according to claim 14, and said pair of sets of third threads comprising opposite patterns of 0—0/1—1/-0—0/5—5/4—4/5—5 and 5—5/4—4/5—5/0—0/-1—1/0—0.

16. A coupling element assembly for slide fasteners comprising:
   a row of laterally spaced coupling elements each having a head portion and a pair of leg portions extending from said head portion; and
   a pair of warp-knit elongate webs each including at least one first thread forming a wale of chain stitches and a second thread disposed in and extending longitudinal along said wale of chain stitches, each of said warp-knit elongate webs extending transversely of said spaced coupling elements and having a longitudinal portion embedded in respective leg portions of said coupling elements to interconnect the coupling elements,
   a pair of third threads knitted with said first threads in said warp-knit elongate webs and having a plurality of parallel portions spaced longitudinally on said first threads extending transversely of said wales,
   said parallel spaced portions being embedded in said coupling elements extending longitudinally along said coupling elements,
   and said parallel spaced portions extending substantially the full length of said coupling elements.

17. A coupling element assembly for slide fasteners according to claim 16, and each of said warp-knit elongate webs including a pair of first threads forming a pair of laterally spaced wales of chain stitches.

18. A coupling element assembly for slide fasteners comprising:
   a row of laterally spaced coupling elements each having a head portion and a pair of leg portions extending from said head portion; and
   a pair of warp-knit elongate webs each including at least one first thread forming a wale of chain stitches and a second thread disposed in and extending longitudinally along said wale of chain stitches, each of said warp-knit elongate webs extending transversely of said spaced coupling elements and having a longitudinal portion embedded in respective leg portions of said coupling elements to interconnect the coupling elements, each of said warp-knit elongate webs including a pair of first threads forming a pair of laterally spaced wales of chain stitches,
   a pair of sets of third threads symmetrically interlaced with said first threads in said warp-knit elongate webs and having a plurality of parallel portions spaced longitudinally on said first threads and extending transversely of said wales,
   said parallel spaced portions being embedded in said coupling elements extending longitudinally along said coupling elements,
   and said parallel spaced portions extending substantially the full length of said coupling elements.

19. A coupling element assembly for slide fasteners according to claim 18, and including a pair of core threads each extending longitudinally between the pair of wales in one of said warp-knit elongate webs.

* * * * *